Figure 1A:
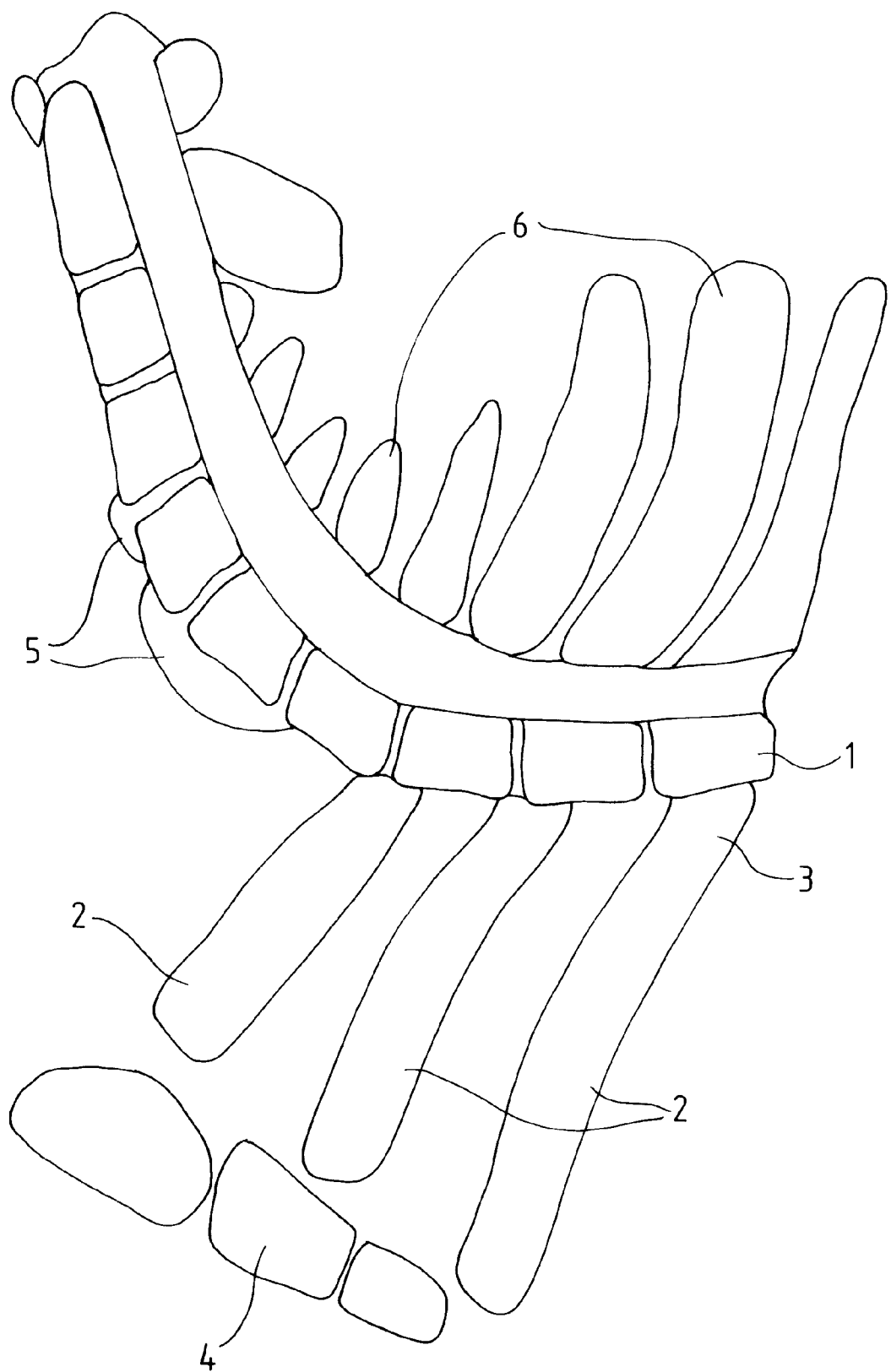

United States Patent
Post

[11] Patent Number: 6,126,535
[45] Date of Patent: Oct. 3, 2000

[54] APPARATUS, TOOL AND METHOD FOR MECHANICAL REMOVAL OF A SPINAL COLUMN PART FROM A PART CARCASS

[75] Inventor: Erling Post, Roskilde, Denmark

[73] Assignee: Slagteriernes Forskingsinstitut, Roskilde, Denmark

[21] Appl. No.: 09/284,451

[22] PCT Filed: Aug. 7, 1998

[86] PCT No.: PCT/DK98/00345

§ 371 Date: Apr. 12, 1999

§ 102(e) Date: Apr. 12, 1999

[87] PCT Pub. No.: WO99/08538

PCT Pub. Date: Feb. 25, 1999

[30] Foreign Application Priority Data

Aug. 14, 1997 [DK] Denmark ................................ 0934/97

[51] Int. Cl.[7] .................................................. A22C 17/00
[52] U.S. Cl. ................................ 452/160; 452/171
[58] Field of Search .................................. 452/136, 160, 452/171

[56] References Cited

U.S. PATENT DOCUMENTS

| 692,824 | 2/1902 | Burleson . | |
|---|---|---|---|
| 3,581,336 | 6/1971 | Herubel | 452/136 |
| 5,407,384 | 4/1995 | Boody et al. | 452/171 |

FOREIGN PATENT DOCUMENTS

| 42490 | 6/1930 | Denmark | 452/160 |
|---|---|---|---|
| 167 044 | 8/1993 | Denmark . | |
| 168 554 | 4/1994 | Denmark . | |
| 0 392 874 | 10/1990 | European Pat. Off. . | |
| 0 502 581 | 9/1992 | European Pat. Off. . | |
| 0 627 168 | 12/1994 | European Pat. Off. . | |
| 0 714 607 | 11/1995 | European Pat. Off. . | |
| 1 406 381 | 6/1965 | France . | |
| 2612370 | 9/1988 | France | 452/160 |
| WO 95/17825 | 7/1995 | WIPO . | |
| WO 07/30594 | 8/1997 | WIPO . | |

*Primary Examiner*—Willis Little
*Attorney, Agent, or Firm*—Tilton Fallon Lungmus & Chestnut

[57] ABSTRACT

The invention relates to an apparatus for mechanical removal of a spinal column part from a part carcass (12), such as a fore-end of a pig carcass, comprising tools for separating the spinal column part from the part carcass by cuts along the spinal column part, and conveyor and guide arrangements for providing a relative movement between the tools and the part carcass during cutting. A first cutting tool (18, 49) is used for mechanically separating the meat on the part carcass from the spinous processes and the dorsal side of the spinal column. The tool has a tapering knife blade (19, 50) with a cutting edge (22) along a first edge and a knife part (20, 51) along a second edge of the tapering blade (19, 50). The knife part (20, 51) is mounted mainly at right angles to the blade and has a cutting edge along the edge closest to the tip of the tapering blade (19, 50). A second cutting tool (28, 55) is used for mechanically separating the meat on the part carcass from the lateral side of the spinal column and may also cut off the ribs from the spinal column. The tool has a cutting blade (29, 56) lying mainly in parallel with the tapering blade (19, 50) of the first tool and is positioned on the same side of the blade (19, 50) as the knife part (20, 51). The two tools perform cuts which go close to the spinal column bone and can be guided so as not to leave more bone remnants in the meat than is known from manual boning of fore-ends. After removal of the spinal column part, the meat can be further processed in cutting rooms into usual meat cuts, skin, bone parts, etc.

31 Claims, 9 Drawing Sheets

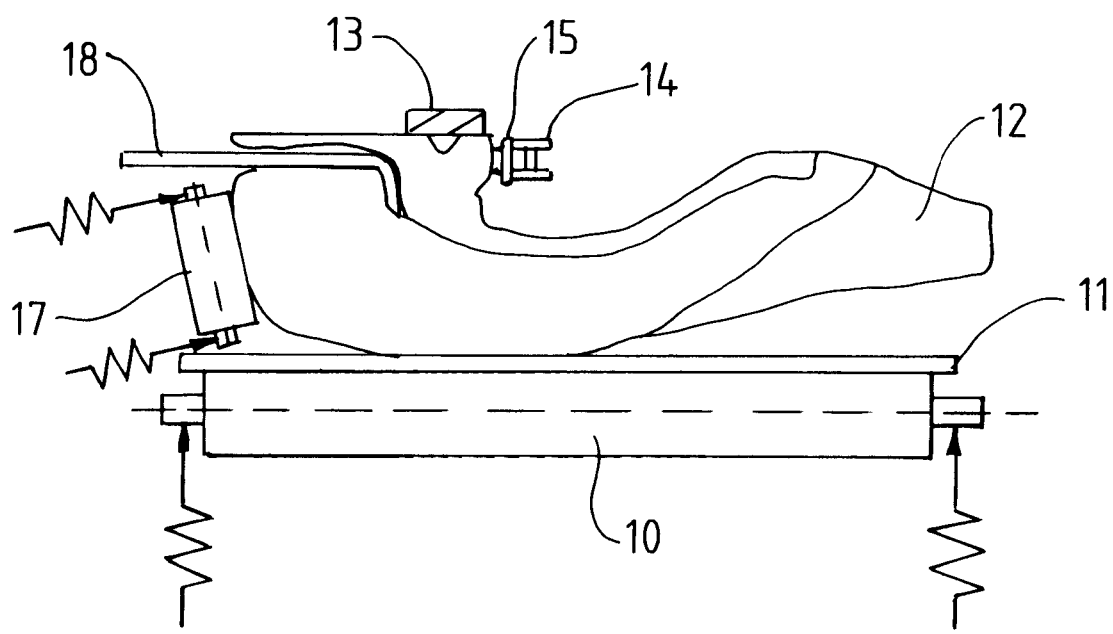

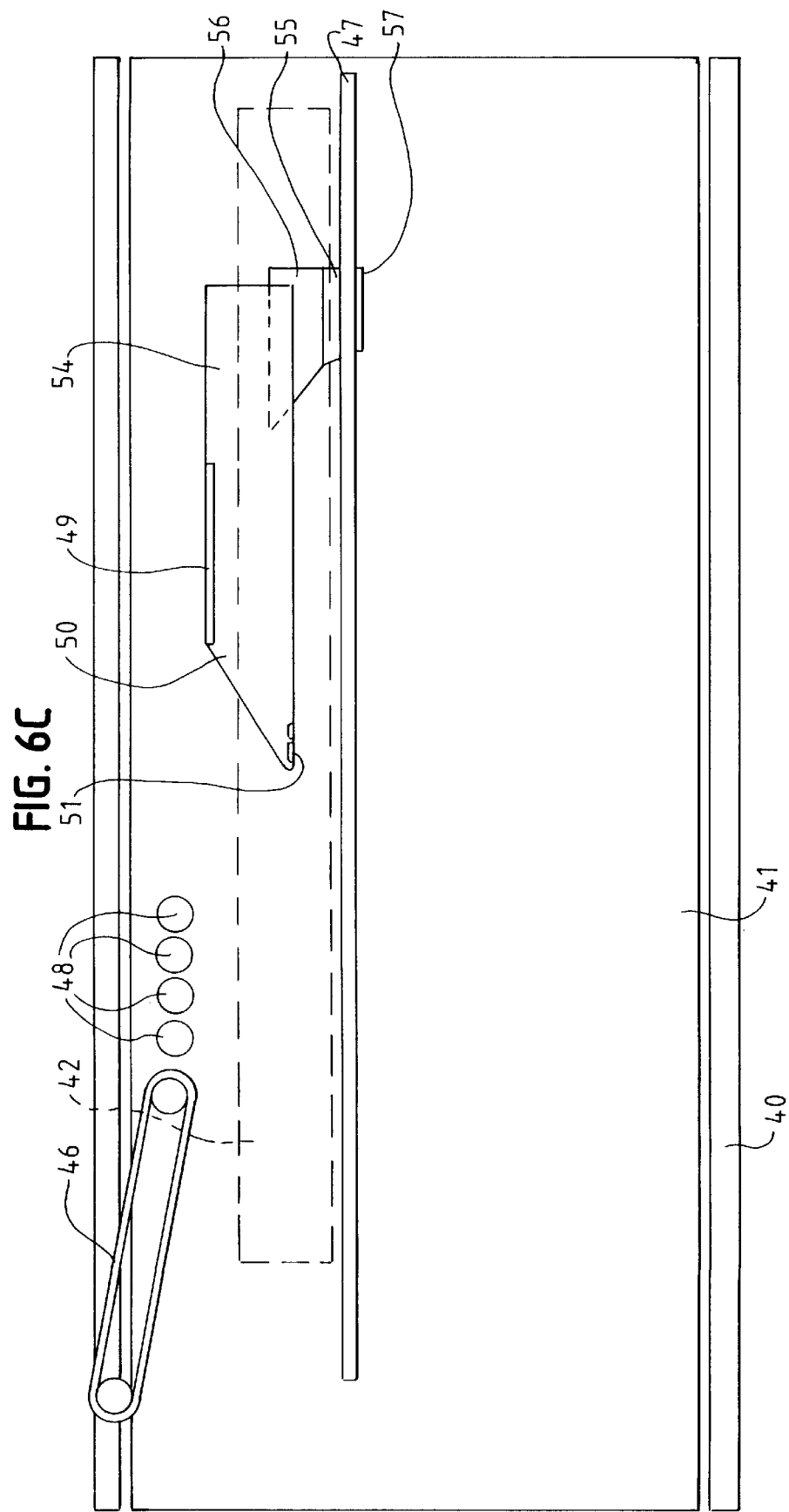

APPARATUS, TOOL AND METHOD FOR MECHANICAL REMOVAL OF A SPINAL COLUMN PART FROM A PART CARCASS

The present invention relates to an apparatus for mechanical removal of a spinal column part from a part carcass, comprising tools for separating the spinal column part from the part carcass by cuts along the spinal column part, and conveyor and guide arrangements for providing a relative movement between the tools and the part carcass during cutting.

After splitting pig carcasses, the sides are divided into three parts: the hams, middles and fore-ends. These carcass parts are processed in different ways.

A so-called rib-top sawing is performed on the middles to remove the spinal column part. The operation consists of a manual cutting off of the thoracic and lumbar vertebrae of the spinal column by means of a circular saw. This cutting leaves bone peaks and ribs in the meat part. The spinous processes are also left, if the carcass has not been back-finned before splitting. These bone parts are removed by a manual finishing treatment.

The operator must take great care when making the saw cuts. If too much bone is left on the middle, the manual finishing treatment is made more difficult. If, on the other hand, the operator attempts to avoid bones, valuable meat will be lost along with the sawn-off bone parts and the tenderloin muscle may also be damaged.

Various machines for the automatic removal of the spinal column part from middles (or loins) are described in the patent literature. The machines are for the most part based on one or two circular saws which saw alongside the bone cutting through the rib heads and possibly also the spinous processes, cf. U.S. Pat. No. 4,134,181 (Schneider), EP-A1-0502.581 (Stork Protecon), EP-A1-0627.168 (Stork Protecon-Langen) and EP-A1-0714.607 (Stork Protecon-Langen). DK-A-326/96 (Slagteriernes Forskningsinstitut) describes the use of roller shears, which avoids formation of meat/bone dust which can cause keeping problems.

A device for the removal of meat in a single piece from the spinal column part and ribs of a loin from a beef carcass is described in WO-A1-9517825 (The Meat Industry Research Institute of New Zealand). The device comprises a first tool cutting along the spinous processes and spinal column, and a second wing shaped tool which separates the meat from the ribs. The device produces meat cuts without ribs giving a lower meat yield than manual boning.

Fore-ends are treated in a manner which differs from treatment of middles and loins. They contain a spinal column part, just as the middles do, but the shape of the spinal column part is more complex. Moreover, fore-ends contain other bones and have a very complicated anatomical structure. It is necessary to use different and more complex boning techniques for obtaining a high meat yield. Skilled operators are required and their time consumption is high.

Various tools have been proposed for extracting the shoulder blade from fore-ends making the boning processes easier for the operators. However, until now no device has been designed for mechanically removal of the spinal column part from fore-ends. The known automatic devices for rib-top sawing of middles and loins will give a low meat yield or leave many bone fragments in the meat if they are used for removal of the spinal column part of a fore-end.

The object of the present invention is to provide an apparatus which can mechanically remove the spinal column part from a part carcass, in particular a fore-end making it possible to replace a part of the demanding work of manual boning with a mechanical operation, without decreasing the meat yield which should be on a comparable level with manual removal of a spinal column part from a fore-end. Preferably, the apparatus should use at least one knife for the mecanical removal thus reducing the amount of sawing dust on the meat.

The above object is achieved by the apparatus according to the invention, which is characterised in that it comprises a first cutting tool for mechanically separating the meat on the part carcass from the spinous processes and the dorsal side of the spinal column, said first cutting tool having a tapering knife blade with a cutting edge along a first edge and a knife part along a second edge of the tapering blade, the knife part being mounted mainly at right-angles to the blade and having a cutting edge along the edge closest to the tip of the tapering blade, and that it also comprises a second cutting tool for mechanically separating the meat on the part carcass from the lateral side of the spinal column, said second cutting tool having a cutting blade lying mainly in parallel with the tapering blade of the first tool and being positioned on the same side of the blade as the knife part.

The apparatus according to the invention is suitable for the mechanical removal of the spinal column part from a part carcass, eg. a fore-end, as the two tools can perform cuts which pass close to the spinal column bone and can be guided/adjusted so as not to leave more bone remnants in the meat than in manual boning. The obtained meat product can easily be processed in the abattoir's cutting room so as to produce usual meat cuts, skin, bone waste etc. The apparatus of the invention is thus able to perform a considerable part of the otherwise complicated and straining manual boning process.

The cutting edge of the tapering blade in the first tool can cut free the spinous processes right down to their base area while the knife part along the other edge of the blade cuts along the dorsal side of the spinal column close to the bone. The tool is designed to guide along the bone surface and due to the tapering shape of the blade cutting is from the base area and upwards to the top of the spinous processes. When the blade is moved tip-first it will follow the line connecting the base areas of the spinous processes, thus cutting close to the bone. The blade will always cut on the same (correct) side of the spinous processes even when the long processes of a fore-end take various inclined positions.

The second tool cuts along the lateral side of the spinal column part, loosening the bone from the meat. The second tool may also serve to cut off the ribs from the spinal column part separating the spinal bone totally from the meat. If desired, the apparatus may however comprise a separate cutting tool for cutting off the ribs from the spinal column before the second tool cuts along the lateral side of the bone. This will make the cutting easier for the second tool. The separate cutting tool may be a circular saw.

The first and second tools can be guided/adjusted independently of each other enabling the above mentioned close cuts along the bone and a high meat yield without many bone remnants in the meat.

The tapering blade of the first tool may have a wedge shape with an angle between the first and second edges of the blade of less than 90°, preferably between 20 and 60°.

The first tool may be suspended in units arranged to press the tool into contact with bones of the part carcass while the tool is moved (relatively) along the spinous processes and dorsal side of the spinal column.

The units may be compressed-air or mechanical spring units. In this embodiment the tool adapts itself automatically to the spinal column, thus cutting close to the bone.

The apparatus of the invention preferably comprises a resiliently suspended presser shoe and/or roller with a contact surface mainly in parallel with the tapering blade and arranged to exert a pressure on the meat surface of the part carcass ahead of the tapering blade while the tool is performing its cutting work. In this way the maximum amount of meat is cut from the neck region. This gives a more correct separation of the spinous processes and meat opposite the first cervical vertebrae improving the yield.

The cutting blade of the second tool may be designed so as to mainly intersect to the track of the knife part of the first tool.

The second tool in the apparatus according to the invention may be a circular saw or similar, but is preferably a knife blade with a cutting edge along one edge and a blunt second edge. It is an advantage to use a knife as this forms only minimum amounts of meat and bone dust.

The second tool may comprise a knife blade having a curved shape, such as a cross section forming an arc of a circle or a flat "V". The width of the knife blade is preferably between 4 and 12 cm.

The blade is preferably tapering and bent at an obtuse angle along a line mainly parallel to the blunt edge of the blade, preferably at an angle of between 145 and 175°. When the blade is tapering, cutting will take place at an inclined angle in relation to the longitudinal direction of the spinal column, whereby the spine bone is pressed in to a closer engagement with a fixing device which may run along the spinal column. The angled shape of the blade will cause the blade to cut more closely into the meat between the two rows of bony protuberances on the lateral side of the spinal column.

The knife blade of the second tool is preferably bent at a mainly perpendicular angle to the plane of the blade at a distance from the blunt edge of the blade. The edge which forms the continuation of the cutting edge along one edge of the blade may be sharpened. This knife part is suitable for making a cut along the underside of the spinal column opposite the transverse processes of the cervical vertebra.

The second tool may be designed for cutting off the ribs from the spinal column part giving a minimum amount of meat and bone dust. The apparatus of the invention may however comprise a third cutting tool designed for cutting off the ribs from the spinal column part.

The second tool may be suspended in units which can set the position of the cutting blade in a direction at right-angles to the plane of the blade. For example the apparatus may comprise a measuring device which directly or indirectly is arranged to measure the position of a rib head in a direction at right-angles to the plane of the cutting blade and a setting device arranged to set the position of the blade as a function of the measured position of the rib head.

The membrane on the ribs in a fore-end forms a kind of valley which is widest at the plane of separation between the middle and the fore-end and narrows in the direction of the first rib. The base of the valley rises up to the first rib, after which it disappears. It has proved the case that a satisfactory cut can be obtained when the second tool is set in relation to the base of the valley at the first rib.

The apparatus of the invention may comprise a tool for mechanically cutting the neck bone strip of a part carcass from the spinal column and the side of the transverse processes.

Between the first and the second cutting tool the apparatus may for example have a tool which comprises two tapering knife parts mainly at right-angles to each other, said parts converging in the direction of the taper end. The cutting tool may have a first guide surface containing the cutting edge in one of the tapering knife parts and a second guide surface containing the cutting edge in the second tapering knife part. The two guide surfaces are mainly at right-angles to each other and are suitable for guiding the tool along the underside of the cervical vertebrae and the transverse processes.

The conveyor and guide arrangements of the present apparatus may comprise means for supporting the spinal column part.

Embodiments of knives and conveyor and guide arrangements are described below. A method of using the apparatus is also described below.

The invention also relates to a cutting tool for mechanically separating the meat on a part carcass from the spinous processes and the dorsal side of a spinal column part. The tool is characterised in that it has a tapering knife blade with a cutting edge along a first edge and a knife part along a second edge of the tapering blade, the knife part being mounted mainly at right-angles to the blade and having a cutting edge along the edge closest to the tip of the tapering blade.

The tip of the tapering blade is preferably rounded with a radius of between 5 and 20 mm so that the blade can slide off the spinous processes.

The tapering blade of the tool may have a wedge shape with an angle between the first and second edges of the blade of less than 90°, preferably between 20 and 60°.

The part of the knife blade nearest to the edge with the knife part is preferably bent 2–4 mm in the direction of the knife part. The blade is thus adapted to the shape of the large spinous processes.

The blade may have a length of between 5 and 30 cm and a width of between 3 and 12 cm. The knife part may have a width of between 1.0 and 3.0 cm and a length of between 2 and 30 cm (i.e. a length of up to the length of the blade).

The cutting part of the cutting edges may be mainly in the surface planes of the blade and the knife part which is designed to face bones of the spinal column part.

The invention also relates to an apparatus comprising a special designed conveyor and guide system for the spinal column part during cutting operations, causing a movement of the part carcass in relation to cutting tools. The apparatus for mechanical removal of a spinal column part from a part carcass, comprising tools for separating the spinal column part from the part carcass by cuts along the spinal column part, and conveyor and guide arrangements for providing a relative movement between the tools and the part carcass during cutting, is characterised in that it comprises a cutting tool for mechanically separating the meat on the part carcass from the spinous processes and the dorsal side of the spinal column, said cutting tool having a tapering knife blade and a knife part which is mounted mainly at right-angles to the blade along one edge thereof, and that it also comprises a conveyor with a motor-driven endless carrier device with contact faces for bone parts of the part carcass, said faces having sharp projections, and a guide surface for other bone parts of the part carcass, said guide surface extending mainly for the length of the conveyor.

The sharp projections are suitable for penetrating bony parts of the spinal column and effecting a fixing between the spinal column and the carrier arrangement. The guide surface is suitable for guiding the spinal column in a plane at eg. right-angles to the contact surfaces of the carrier device but may also serve to convey the spinal column in a fixed manner (eg. by means of a conveyor with a carrier device).

The edge of the tapering blade with the knife part may be placed mainly in parallel with the contact faces of the carrier device and with the guide surface.

The tapering knife blade may be mainly in parallel with the contact faces of the carrier device, the knife part project away from said faces, and the tip of the tapering blade point in a direction opposite the conveying direction of the carrier device.

The angle between the contact faces and the guide surface may be between 60 and 90°.

The apparatus may have a roller or belt conveyor opposite the contact faces of the carrier device, said conveyor being resiliently suspended and arranged to press bones of the part carcass against the sharp projections on the contact faces. The contact surfaces of the roller or belt conveyor for the part carcass are preferably driven in the same direction as the contact surfaces of the carrier device.

The apparatus may have a roller or belt conveyor opposite the guide surface, said conveyor being resiliently suspended and arranged to press bones of the part carcass against the guide surface (which may comprise a conveyor having a carrier device with sharp projections).

The cutting tool may be suspended in units arranged to press the tool into contact with bones of the part carcass while the tool is moved (relatively) along the spinous processes and the dorsal side of the spinal column.

The apparatus may comprise a further cutting tool for mechanically separating the meat on the part carcass from the lateral side of the spinal column.

Furthermore, the apparatus may comprise a tool for cutting off the ribs from the spinal column.

Embodiments of the cutting tool and further tools are described above. A method of using the apparatus is also described below.

The invention further relates to a method for mechanical removal of a spinal column part from a part carcass, wherein the spinal column part is separated from the part carcass by cuts along the spinal column part which are performed by a relative movement between cutting tools and the part carcass. The method is characterised in that a mechanical separation of the meat on the part carcass from the spinous processes and the dorsal side of the spinal column is effected by means of a first cutting tool with a tapering knife blade with a cutting edge along a first edge and a knife part along a second edge of the tapering blade, the knife part being mounted mainly at right-angles to the blade and having a cutting edge along the edge closest to the tip of the tapering blade, whereby the knife blade is guided along the spinous processes and the knife part is moved along the dorsal side of the spinal column, and that a mechanical separation of the meat on the part carcass from the lateral side of the spinal column is effected by means of a second cutting tool with a cutting blade which is moved mainly in parallel with the tapering blade of the first tool and positioned on the same side of the blade as the knife part.

The tapering blade used in the method may have a wedge shape with an angle between the first and second edges of the blade of less than 90°, preferably between 20 and 60°.

The first tool may be suspended in units arranged to press the tool into contact with bones of the part carcass while the tool is moved (relatively) along the spinous processes and the dorsal side of the spinal column.

The tapering blade of the first tool may be moved with the tip and the knife part close to the bottom area of the spinous processes.

The cutting blade of the second tool may be moved so as to mainly intersect the track of the knife part on the first tool.

Cutting off of the ribs from the spinal column part may be effected by means of the second cutting tool or a third cutting tool.

The spinal column part may be supported during cutting.

During cutting the position of the second tool in a direction at right-angles to the plane of the spinous processes may be independent of the actual position of the first tool in the same direction.

The invention also relates a method for mechanical removal of a spinal column part from a part carcass, wherein the spinal column part is separated from the part carcass by cuts along the spinal column part which are performed by a relative movement between cutting tools and the part carcass. The method is characterised in that a mechanical separation of the meat on the part carcass from the spinous processes and the dorsal side of the spinal column is effected by means of a cutting tool with a tapering knife blade and a knife part which is mounted mainly at right-angles to the blade along one edge thereof, whereby the knife blade is guided along the spinous processes and the knife part is moved along the dorsal side of the spinal column, and that the relative movement between the cutting tool and the part carcass is effected by means of a conveyor with a motor-driven endless carrier device with contact faces for bone parts of the part carcass, said faces having sharp projections, and a guide surface for other bone parts of the part carcass, said guide surface extending mainly for the length of the conveyor.

The cutting tool used in the method may be suspended in units arranged to press the tool into contact with bones of the part carcass while the tool is moved (relatively) along the spinous processes and the spinal column.

Before cutting, the part carcass may be placed with the rind side on a roller or belt conveyor which is mounted opposite the contact faces of the carrier device, said conveyor being resiliently suspended and arranged to press the part carcass against the sharp projections on the contact faces, and the part carcass may then be conveyed by the conveyor and guided into the gap between the conveyor and the contact faces of the carrier device and towards the guide surface.

A part carcass is preferably a fore-end or middle of a pig's carcass. However, the invention is not limited to this but may also find application in boning a part carcass from other animals, especially cattles such as cows, calves, bulls, young bulls, sheep and lambs.

In the present description a part carcass is a meat piece which is obtained by splitting of a carcass and then dividing a produced carcass side in two or more parts by cuts transversely to the spinal column part. Typically, part carcasses are: fore-ends, middles and hams.

The apparatus of the invention has also proved suitable for removing the spinal column part from middles and unprocessed loins. It can thus perform two functions in the abattoir.

Cuts which are performed by means of the apparatus and according to the method of the invention may be placed more or less closely to the bone, leaving behind a greater or lesser proportion of bone in the meat part. The optimal amount being left in the meat part depends on current conditions (price, markets, labour resources etc.).

A major advantage of the invention is that there is no need to cut through the spinous processes which therefore can be removed along with the spinal column.

When two parts are mainly in parallel, this means in the present description that they may be parallel or form a mutual angle of up to 10–20°. When two parts are mainly at right-angles this means that their mutual angle may deviate from a right-angle by up to 10–20°.

Use of knives for the cuts mentioned will bring significant advantages compared to circular saws, as bone and meat dust will be avoided, noise levels reduced and especially as it will become possible to cut close to the bone, because the shape of the knives can be adapted for this purpose.

When the blade of the second tool has a curved shape the angle to the blade of the first tool is to the medium plane of the curved blade.

Figure 1B:
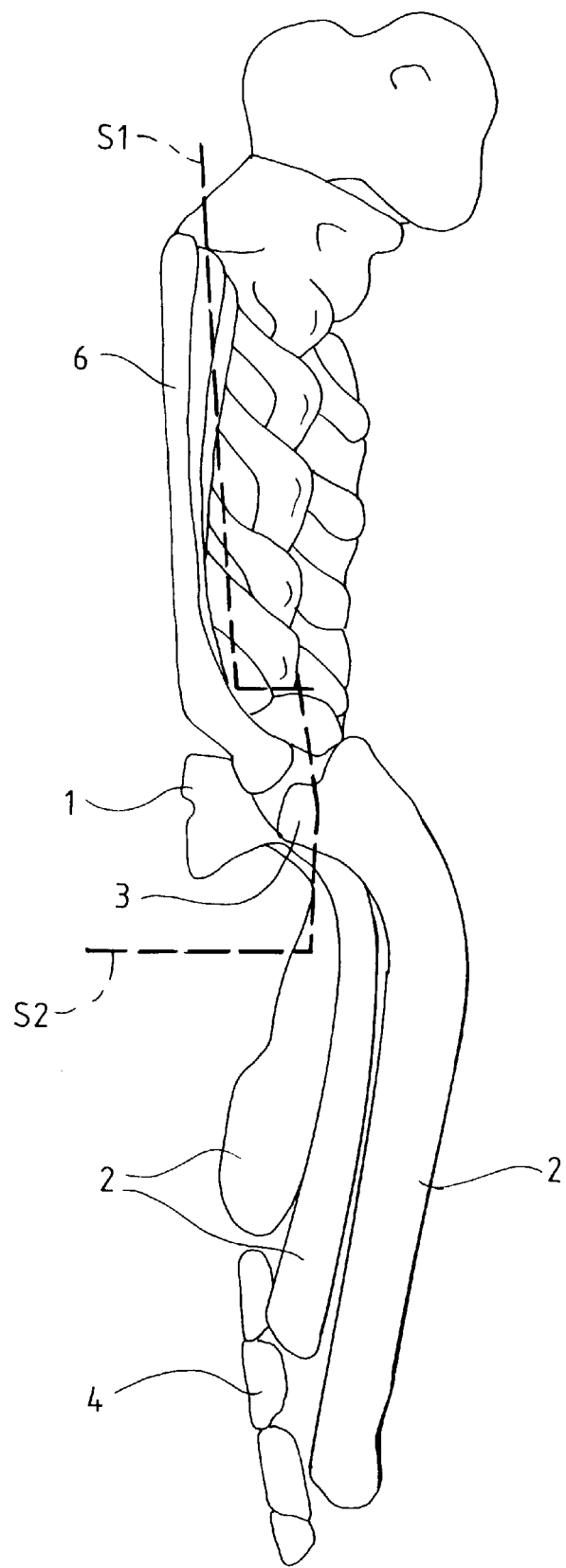
Figure 2A:
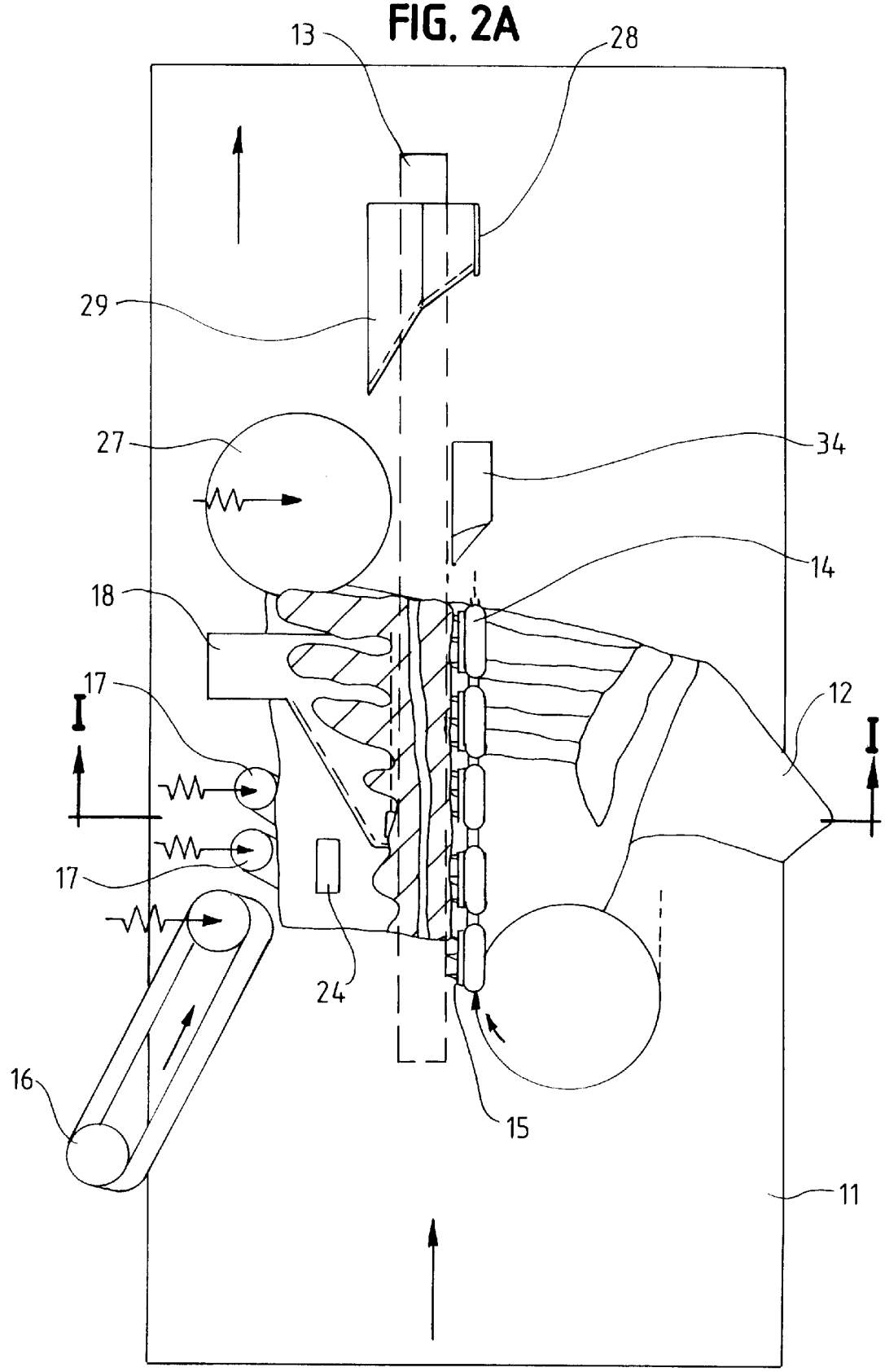
Figure 3A:
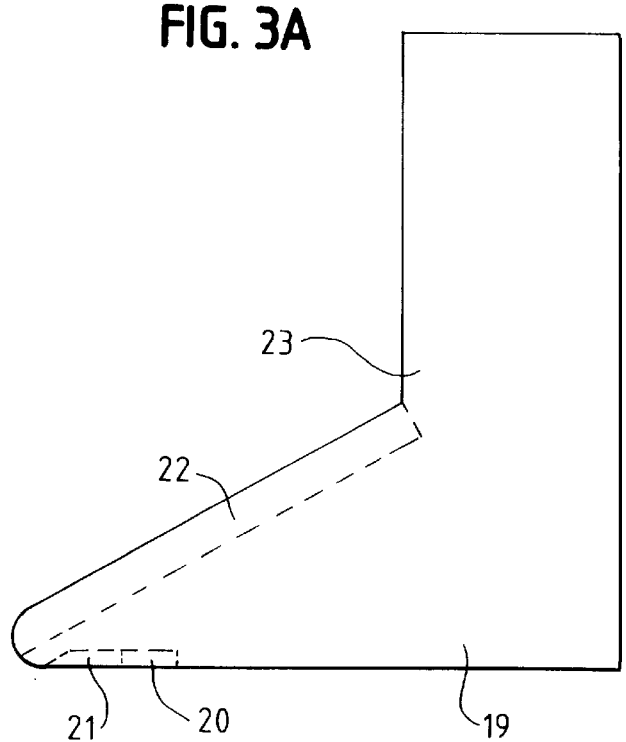
Figure 3B:
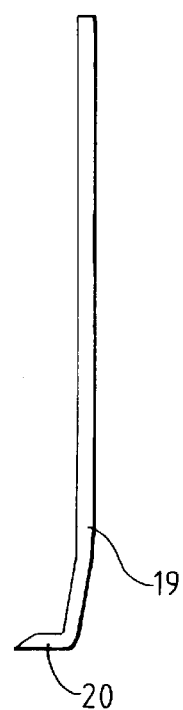
Figure 4:
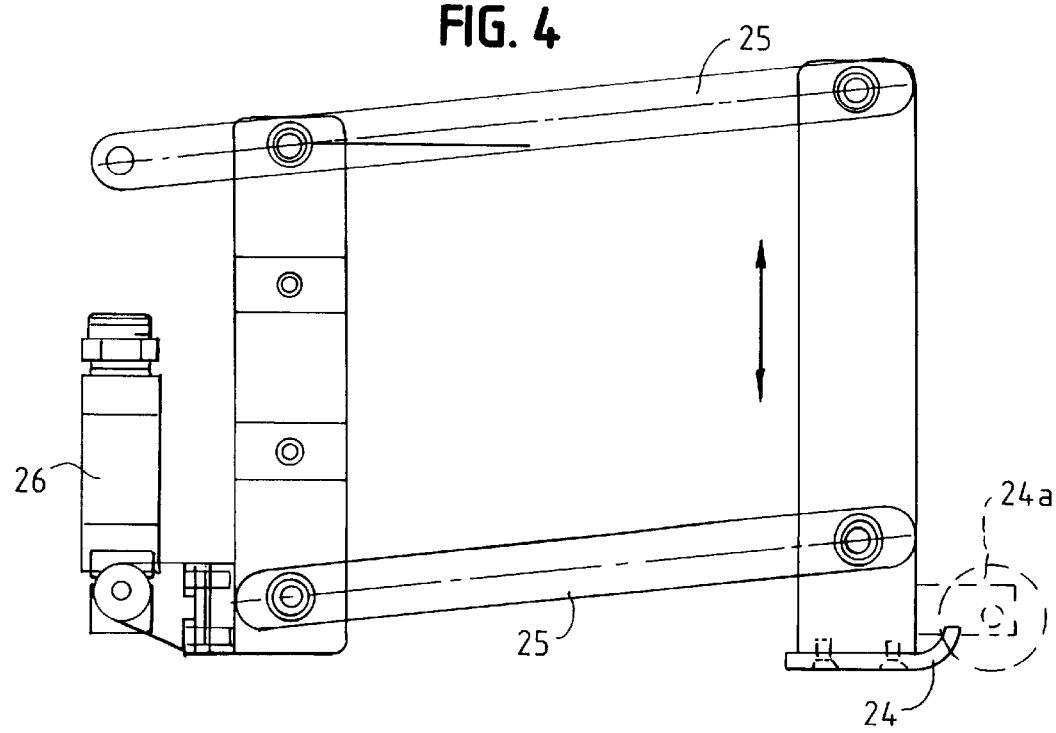
Figure 5:
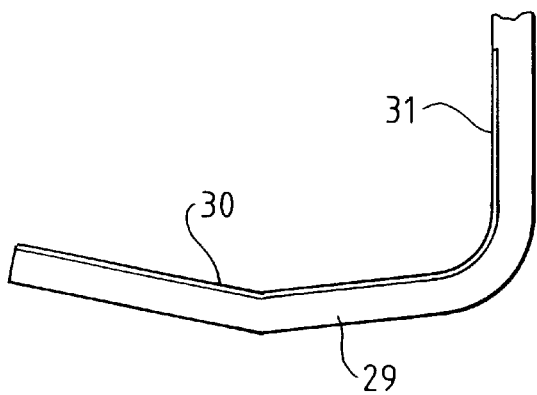
Figure 6A:
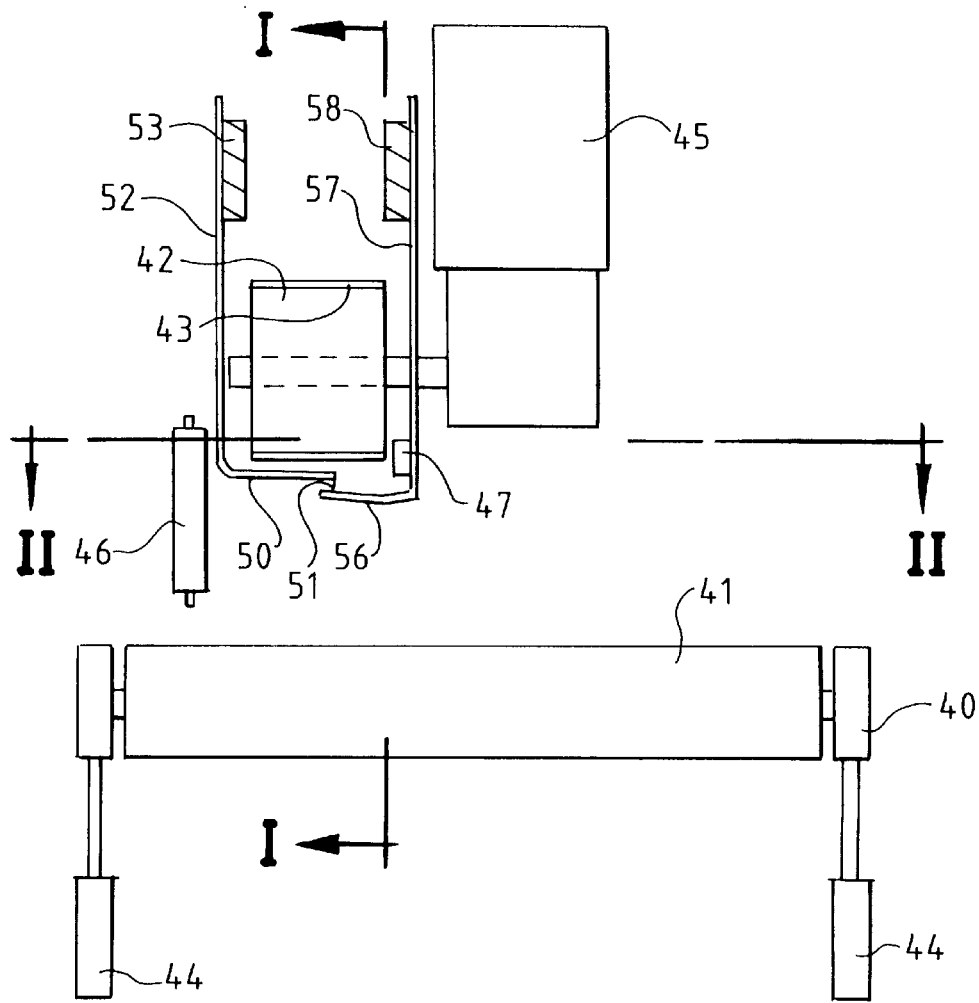
Figure 6B:
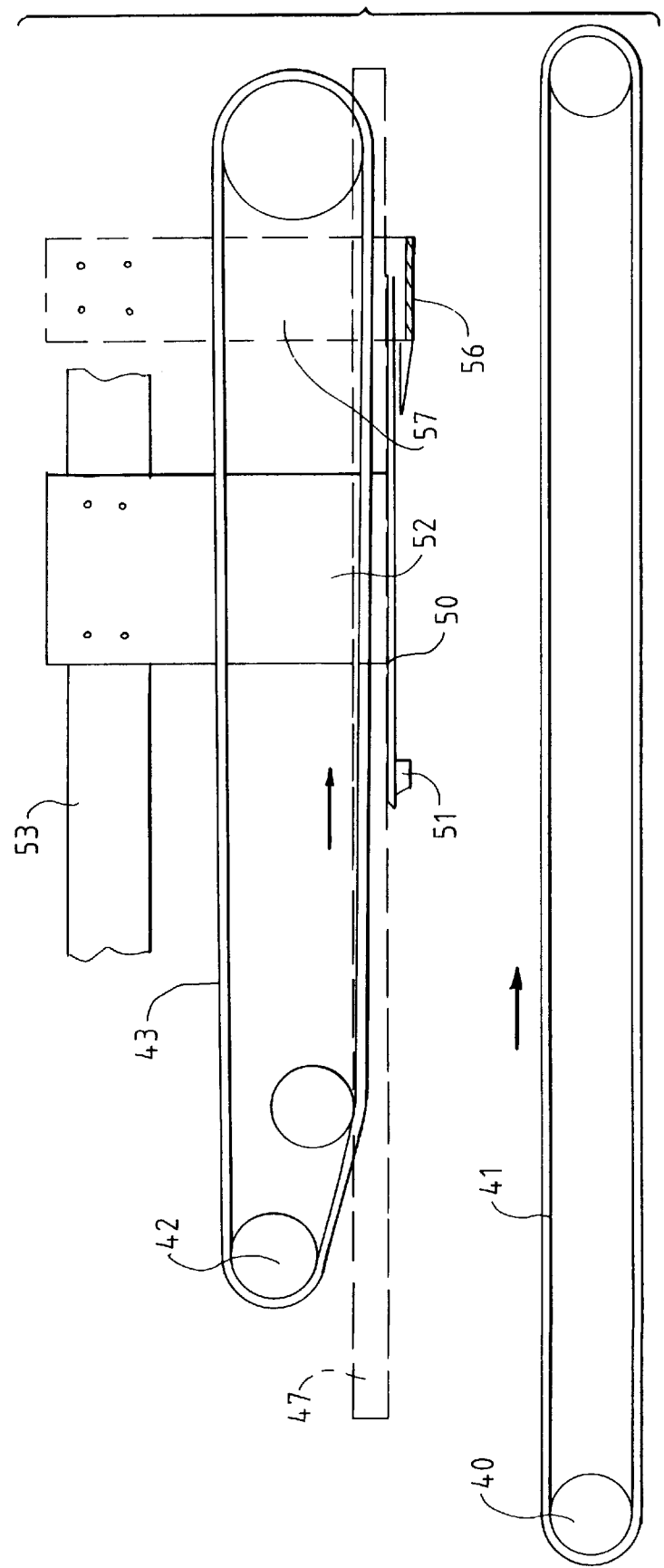
Figure 7:
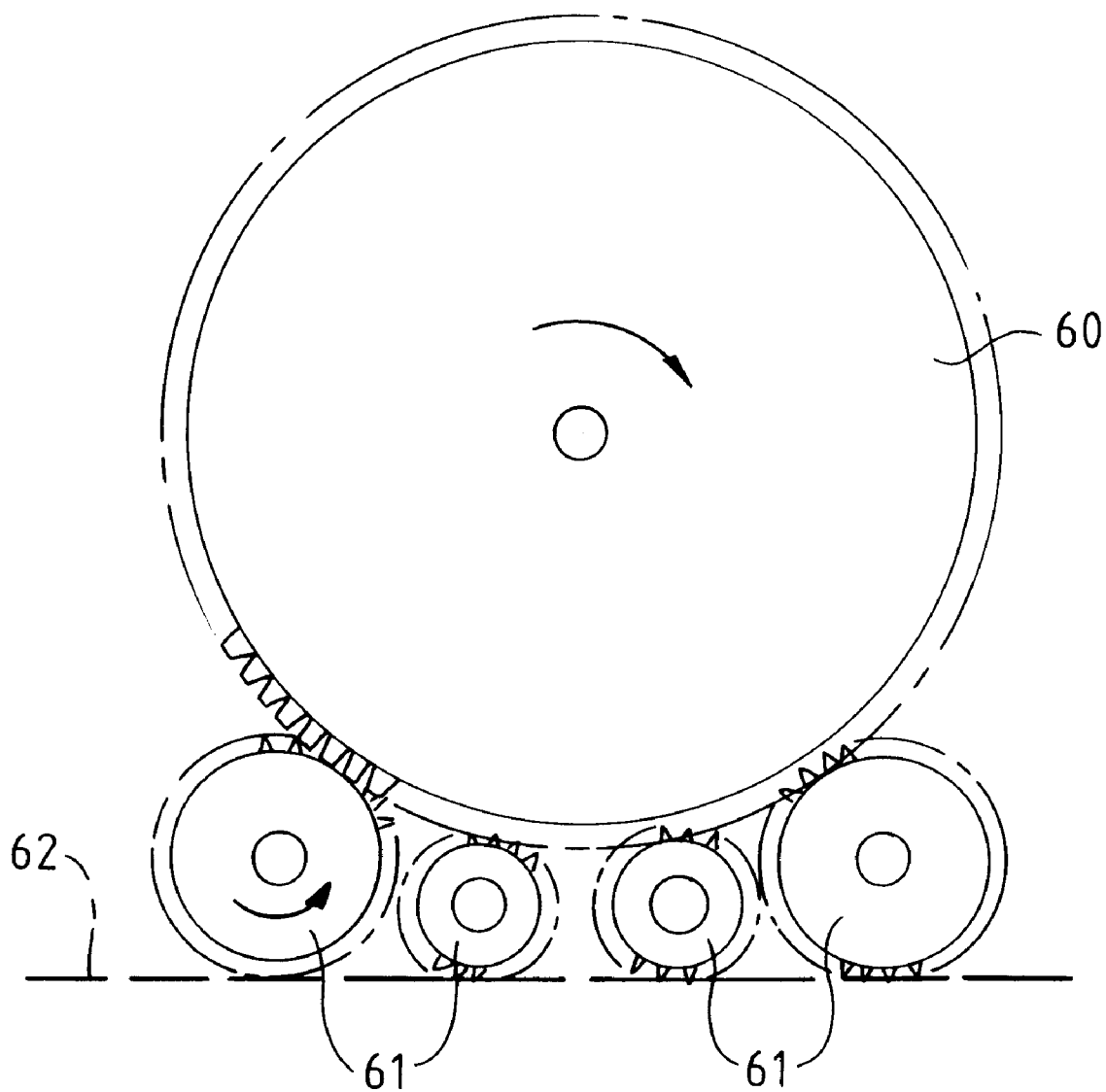

The invention is described in further detail in the following with reference to the drawings, wherein FIG. 1A shows the surface bones of a fore-end, FIG. 1B shows the surface bones seen in the direction of the spinal column, FIG. 2A shows a first embodiment of an apparatus according to the invention for the removal of the spinal column part from a fore-end, FIG. 2B shows a cross-section of the apparatus along line I—I in FIG. 2A, FIG. 3A shows a knife tool in the apparatus, FIG. 3B shows the tool seen from the side, FIG. 4 shows a presser shoe arrangement in the apparatus, FIG. 5 shows a second knife tool in the apparatus, FIG. 6A shows a second embodiment of the apparatus according to the invention, FIG. 6B shows a cross-section of the apparatus along line I—I in FIG. 6A, FIG. 6C shows a cross-section of the apparatus along line II—II in FIG. 6A, and FIG. 7 shows a guiding conveyor.

Surface bones

The surface bones of a fore-end comprise the spinal column part 1 and the ribs 2 (FIGS. 1A and 1B). The ribs are connected by their rib heads 3 to the thoracic vertebrae of the spinal column and are mutually connected by the sternum 4.

The cervical vertebrae of the spinal column (the neck bone) have several transverse processes 5, which together with the vertebrae form a recess for the neck bone strip. This is a long muscle running along the cervical vertebrae.

The thoracic and cervical vertebrae of the spinal column have spinous processes 6 which are in the symmetrical plane of the carcass. Most often the processes are cut through asymmetrically such that the bone mass is non-uniformly distributed on the right and left fore-end.

In FIG. 1B the broad dashed line S1 shows the angled cut which is made by the first tool in the apparatus of the invention. The broad dashed line S2 shows the cut which is made by the second tool in the apparatus.

First embodiment

The apparatus in FIGS. 2A and 2B for removal of the spinal column part from a fore-end comprises a conveyor 10 with a belt 11, which serves to support and transport fore-end 12. In FIG. 2A the spinal column of the fore-end is hatched.

Over belt 11 is a guide rail 13 which serves to guide the spinal column part in one plane. Conveyor 10 is spring-suspended and presses the fore-end up against the rail. A mechanically driven endless chain 14 which has contact plates 15 with spikes forms a side guide for the spinal column in another plane. The angle between surface of rail 13 and contact plates 15 of chain 14 is between 60 and 90°. If desired, the guide rail 13 may be designed in a similar way, i.e. have an endless chain with spiked contact plates (and possibly also an angled guide rail connecting the two chain systems). A vertical belt conveyor 16 guides the fore-end towards the chain 14 and presses the spinal column bone into the spikes on the contact plates 15. The belt conveyor 16 is spring-suspended to adapt to the fore-end. At its far end the belt conveyor passes into pressure rollers 17 which are also spring-suspended. For the spring suspension of conveyor 10, belt conveyor 16 and pressure rollers 17, compressed-air cylinders may for example be used, the piston rods of which press in a resilient manner on the fore-end in the direction shown by the arrows. Instead of compressed-air cylinders, mechanical springs with a similar function may be used.

The apparatus in FIGS. 2A and 2B has a first knife tool 18 for separation of the meat on the fore-end from the spinous processes and the dorsal side of the spinal column part. The design of the tool is shown in FIGS. 3A and 3B. The tool has a tapering plate 19 (length between 5 and 30 cm; width between 3 and 12 cm) with a fin 20 along one edge close to the tip of the plate. The fin is at right-angle to the plane of the plate and has a cutting edge along the vertical or incline edge closest to the tip of the plate 19. The fin projects 1–3 cm from the plane of plate 19. The purpose of the fin is to make a cut along the dorsal (top) side of the spinal column. The cut is made when the fore-end resting against guide rail 13 and spiked plates 15 is moved past the tool, which is held stationary.

The tapering plate 19 has a cutting edge 22 along the other edge, which serves to cut free the spinous processes to their base. This is done in the same process as when the fin cuts along the dorsal side of the spinal column part. The tapering shape of the plate means that cutting can be guided closely along the spinous processes and closely down against the dorsal side of the spinal column part.

The tool is actuated preferably by spring or compressed-air units which during cutting press it against the spinous processes and down onto the dorsal side of the spinal column part, as it has a plate part 23 which is fixed to a spring-loaded beam or similar.

Before the splitting of the carcass, the spinous processes are in some abattoirs cut free (free-cutting) or the muscles are separated from the spinous processes (blank-finning). Cutting edge 22 on the tapering plate then serves to complete the free-cutting/separation, i.e. to cut right down to the base at the back and neck. However, it is not a condition for the function of the apparatus that a prior separation has been made between processes and adjacent muscles. The whole separation can be effected by means of the cutting edge 22 on the tapering plate.

During cutting with the knife tool 18, the cervical vertebrae (neck bone) of the spinal column are straightened out, as the tool and the following guiding device press the cervical vertebrae in the direction of guide rail 13 and chain 14 so that the spinal column finally lies in a straight line as indicated in FIG. 2A.

Ahead of the tool 18 may be mounted a presser shoe device with a contact plate 24, which during cutting by the tool 18 serves to press down the meat opposite the first cervical vertebrae. The plate can be connected to a double swing arm system 25 (FIG. 4), which by means of a compressed-air cylinder 26 presses the plate in the direction of the fore-end. As a supplement or replacement to the contact plate, the apparatus may have a presser roller 24a for pressing down the meat. The roller is shown by dashed lines in FIG. 4.

Immediately behind the knife tool 18 is a guide disk 27 (FIG. 2A), which assumes a position in the track left by the cutting tool. The disk holds the spinous processes up and presses the spinal column firmly against the contact plates of the chain and the guide rail. FIG. 7 shows an alternative embodiment of a guide device which also serves to convey the fore-end. The device or guiding conveyor comprises a motor-driven toothed wheel 60 which engages four other toothed wheels 61 having a common tangent (dashed line 62). The teeth of the wheels 61 are sharp and designed to penetrate the bone of the spinal column part opposite the chain 14 (the device is suspended in spring or compressed-air units pressing it toward the spinal bone). The peripheral speed of wheels 61 corresponds to the speed of chain 14. Several guiding conveyors may be placed opposite chain 14. Alternatively, a guiding conveyor having long teeth on one side of a motor-driven chain may be used to guide and convey the spinal bone.

Behind the disk 27 or guiding conveyor 60, 61 is a second cutting tool 28. This serves to cut through the ribs at the rib heads and to separate the meat from the lateral side of the spinal column part. The tool has a knife blade 29 which tapers in the opposite direction to blade 19 in tool 18. At approximately the centre, the knife is bent to an obtuse angle (FIG. 5), such that the cutting edge 30 of the blade can cut close to the bone. In an alternative embodiment the knife is curved to follow the bone even closer. The cross-section of the knife may eg. be an arc of a circle. Blade 29 is at its fixing end bent upwards at an angle of approx. 90° and the edge which forms the continuation of cutting edge 30 is sharpened. The cutting edge 31 thus formed serves to cut along the underside of the spinal column part opposite the transverse processes of the cervical vertebra.

Tool 28 is fixed firmly to the apparatus, or if desired it may be guided in a forced manner along a line or curve. The distance from blade 29 to the guide rail 13 may be set automatically for each fore-end.

For this purpose the apparatus may have a measuring device to determine the optimal cutting position. The device may for example sense the base position of the valley-shaped surface formed by the rib membranes.

As the fore-end is carried through the apparatus, a mechanical sensor senses the distance from the guide rail 13 to the base of the valley-shaped surface. When the distance is at its least (at the first rib), the optimal cutting position has been found and the distance of tool 28 to the guide rail 13 is set in accordance with this. In a simple embodiment the measuring device is merely a mechanical system with a sensor arm connected to a height adjustment mechanism of the tool which locks the tool setting at the point where no further lessening of the distance to the guide rail is detected.

Blade 29 is mainly in parallel with the tapering plate 19 in tool 18, but has a vertical distance from the contact surface of the guide rail which is 1–3 cm greater, so that it is at the same level as the rib heads of the fore-end. The tip of the blade cuts into the fore-end such that the cut mainly crosses the track made by fin 20 on knife tool 18. Preferably, the first tool 18 and the second tool 28 are suspended independently of each other enabling cuts close to the spinal bone.

In front of the tool 28 the apparatus may have a tool designed for cutting through the ribs (preferably rib heads). This will reduce the demands to the blade of tool 28 and possibly to the fixing of the fore-end. A circular saw may be used.

Opposite disk 27 or guiding conveyor 60, 61 is a tool 34, which has two knives at right-angles which serve to cut the neck bone strip free from the underside and transverse processes of the cervical vertebrae, without cutting the strip's connection with the neck fillet.

When the fore-end has passed all cutting tools, the spinal column part with spinous processes has mainly been cut off from the fore-end. The cutting is performed close to the bone, providing a good meat yield.

When the tools are guided close to the bone, tips of protuberances and bone projections are left behind in the meat. These bone remnants can be removed by normal manual finishing treatment.

The knife tools do not cut through the spinous processes, unlike the known devices for removing the spinal column part (rib-top) from middles. Consequently, finishing treatment does not require the removal of spinous processes left behind in the meat.

Second embodiment

The apparatus in FIGS. 6A, 6B and 6C for removing the spinal column part from a fore-end comprises a resiliently suspended conveyor 40 with a belt 41 for the fore-end from which the spinal column is to be removed. Above the conveyor is a firmly fixed conveyor 42 with a belt 43 armed with spikes. These penetrate the spinal column while the fore-end is conveyed between the belts. Compressed-air cylinders 44 connected to the suspension of conveyor 40 press the fore-end up into the spikes. Conveyor 42 has a motor 45, by means of which the fore-end can be conveyed with considerable force between belts 41 and 43.

At the entry end of the conveyor 40 is a vertical belt conveyor 46 for guiding the fore-end against a fixed guide rail 47 which extends along the length of the apparatus. The angle between the contact faces of belt 43 and guide surface 47 is between 60 and 90°. The guide rail serves as a contact face for the spinal column of the fore-end, as vertical rollers 48 (FIG. 6C) push the fore-end in the direction of the rail. The guide rail may instead be designed in a way similar to the conveyor 42 with a belt armed with spikes (and possibly an angled rail connecting the belts of the conveyor systems). Belt conveyor 46 and rollers 48 are mounted in a yielding manner so as to adapt to the shape of the fore-end.

The apparatus includes two knife tools of mainly the same design as the tools 18 and 28 in FIG. 2A. The first tool 49 (FIG. 6C) consists of a tapering plate 50 which along one edge, and at the tip of the plate, has a fin 51 projecting at right-angles to the plane of the plate. The fin is provided with a cutting edge on the edge nearest the tip of the plate. The other edge of the tapering plate is sharpened.

Tool 49 is arranged at such a distance from guide rail 47 and the spiked belt 43 that in a corresponding way to the tool of the first embodiment it cuts free the spinous processes and cuts along the dorsal side of the spinal column at the base of the processes.

Knife tool 49 has a vertical plate part 52 for fixing the tool on a spring-loaded beam 53 (FIG. 6B). The tool also has a guide part 54 which is part of the tapering plate 50 and serves to hold the spinous processes up after they have been cut free and to hold the spinal column against the spiked belt and the guide rail. Alternatively, at least one guiding conveyor of the design shown in FIG. 7 may be used instead of the guide part 54.

Under guide part 54 is arranged a second knife tool 55. This serves to cut the ribs and meat from the spinal column. The tool has a tapering plate part 56 with a cutting edge on the edge of the plate facing the guide rail 47. By means of a joining piece 57 the tool is fixed to a beam 58. Preferably, the beams 53 and 58 are suspended independently. The plate part 56 has a vertical (adjustable) distance to the spiked belt 43 of between 1 and 3 cm.

The guide rail 47 and the spiked belt 42 may be fixed firmly in relation to the knife tools 49 and 55, but preferably the distance of the tools to the rail and the belt is altered (independently) according to need, e.g. according to a previously defined curve, as a function of the dimensions of the actual fore-end and/or by using spring or compressed-air units to push the tools towards the rail/belt so that they follow the bone surface themselves.

Other embodiments

The above embodiments of the apparatus according to the invention may also be used for removing the spinal column part from a loin or middle. The distances between the tools and the guide surfaces/carriers may differ from in the case of a fore-end.

In the embodiments described, the part carcass (fore-end or middle) is moved in relation to stationary knife tools, but the apparatus may instead be designed such that the part carcass is stationary while the knife tools are moved. The part carcass may, for example, be fixed in position in a stationary fixture.

The apparatus may include other tools than those described here. For example, it may include a knife system for cutting off the riblet.

What is claimed is:

1. Apparatus for mechanical removal of a spinal column part from a part carcass (12), comprising tools for separating the spinal column part from the part carcass by cuts along the spinal column part, and conveyor and guide arrangements for providing a relative movement between the tools and the part carcass during cutting, characterised in that the apparatus comprises a first cutting tool (18, 49) for mechanically separating the meat on the part carcass from the spinous processes and the dorsal side of the spinal column, said first cutting tool having a tapering knife blade (19, 50) with a cutting edge (22) along a first edge and a knife part (20, 51) along a second edge of the tapering blade (19, 50), the knife part (20, 51) being mounted mainly at right-angles to the blade and having a cutting edge along the edge closest to the tip of the tapering blade (19, 50), and that the apparatus also comprises a second cutting tool (28, 55) for mechanically separating the meat on the part carcass from the lateral side of the spinal column, said second cutting tool having a cutting blade (29, 56) lying mainly in parallel with the tapering blade (19, 50) of the first tool and being positioned on the same side of the blade (19, 50) as the knife part (20, 51).

2. Apparatus as claimed in claim 1, characterised in that the tapering blade (19, 50) of the first tool (18, 49) has a wedge shape with an angle between the first and second edges of the blade of less than 90°, preferably between 20 and 60°.

3. Apparatus as claimed in claim 1 or 2, characterised in that the first tool (18, 49) is suspended in units arranged to press the tool into contact with bones of the part carcass while the tool is moved (relatively) alone the spinous processes and dorsal side of the spinal column.

4. Apparatus as claimed in claim 1, characterized in that the cutting blade (29, 56) of the second tool (28, 55) is designed so as to mainly intersect to the track of the knife part (20, 51) of the first tool (18, 49).

5. Apparatus as claimed in claim 1, characterized in that the second tool (28, 55) comprises a knife blade having a curved shape, such as a cross-section forming an arc of a circle or a flat "V".

6. Apparatus as claimed in claim 1, characterized in that the second tool (28, 55) is designed for cutting off the ribs from the spinal column part.

7. Apparatus as claimed in claim 1, characterized in that it comprises a third cutting tool designed for cutting off the ribs from the spinal column part.

8. Apparatus as claimed in claim 1, characterized in that the second tool (28, 55) is suspended in units which can set the position of the cutting blade (29, 56) in a direction at right-angles to the plane of the blade.

9. Apparatus as claimed in claim 8, characterised in that it comprises a measuring device which directly or indirectly is arranged to measure the position of a rib head in a direction at right-angles to the plane of the cutting blade (29, 56), and that it has a setting device arranged to set the position of the blade (29, 56) as a function of the measured position of the rib head.

10. Apparatus as claimed in claim 1, characterized in that the conveyor and guide arrangements comprise means for supporting the spinal column part.

11. Apparatus for mechanical removal of a spinal column part from a part carcass (12), comprising tools for separating the spinal column part from the part carcass by cuts along the spinal column part, and conveyor and guide arrangements for providing a relative movement between the tools and the part carcass during cutting, characterised in that the apparatus comprises a cutting tool (18, 49) for mechanically separating the meat on the part carcass from the spinous processes and the dorsal side of the spinal column, said cutting tool having a tapering knife blade (19, 50) and a knife part (20, 51) which is mounted mainly at right-angles to the blade (19, 50) along one edge thereof, and that the apparatus also comprises a conveyor with a motor-driven endless carrier device (14, 43) with contact faces (15) for bone parts of the part carcass, said faces having sharp projections, and a guide surface (13, 47) for other bone parts of the part carcass, said guide surface extending mainly for the length of the conveyor.

12. Apparatus as claimed in claim 11, characterized in that the edge of the tapering blade (19, 50) with the knife part (20, 51) is placed mainly in parallel with the contact faces (15) of the carrier device (14, 43) and with the guide surface (13, 47).

13. Apparatus as claimed in claim 11 or 12, characterized in that the tapering knife blade (19, 50) is mainly in parallel with the contact faces (15) of the carrier device (14, 43), that the knife part (20, 51) projects away from said faces, and that the tip of the tapering blade (19, 50) points in a direction opposite the conveying direction of the carrier device (14, 43).

14. Apparatus as claimed in claim 11, characterized in that the angle between the faces (15) and the guide surface (13, 47) is between 60 and 90°.

15. Apparatus as claimed in claim 15, characterized in that it has a roller or belt conveyor (16, 17, 40) opposite the contact faces (15) of the carrier device (14, 43), said conveyor (16, 17, 40) being resiliently suspended and arranged to press bones of the part carcass against the sharp projections on the contact faces (15).

16. Apparatus as claimed in claim 11, characterized in that the cutting tool (18, 49) is suspended in units arranged to press the tool into contact with bones of the part carcass while the tool is moved (relatively) along the spinous processes and the dorsal side of the spinal column.

17. Apparatus as claimed in claim 11, characterized in that is has a roller or belt conveyor (10, 11, 46, 48) opposite the guide surface (13, 47), said conveyor being resiliently suspended and arranged to press bones of the part carcass against the guide surface (13, 47).

18. Apparatus as claimed in claim 11, characterized in that it comprises a further cutting tool for mechanically separating the meat on the part carcass from the lateral side of the spinal column.

19. Apparatus as claimed in claim 11, characterized in that it comprises a tool for cutting off the ribs from the spinal column.

20. Method for mechanical removal of a spinal column part from a part carcass (12), wherein the spinal column part is separated from the part carcass by cuts along the spinal column part which are performed by a relative movement between cutting tools and the part carcass, characterised in that a mechanical separation of the meat on the part carcass from the spinous processes and the top side of the spinal column is effected by means of a first cutting tool with a tapering knife blade (19, 50) with a cutting edge (22) along a first edge and a knife part (20, 51) along a second edge of the tapering blade (19, 50), the knife part (20, 51) being mounted mainly at right-angles to the blade and having a cutting edge along the edge closest to the tip of the tapering blade (19, 50), whereby the knife blade (19, 50) is guided along the spinous processes and the knife part (20, 51) is moved along the dorsal side of the spinal column, and that a mechanical separation of the meat on the part carcass from the lateral side of the spinal column is effected by means of a second cutting tool with a cutting blade (29, 56) which is moved mainly in parallel with the tapering blade (19, 50) of the first tool and positioned on the same side of the blade (19, 50) as the knife part (20, 51).

21. Method as claimed in claim 20, characterized in that the tapering blade (19, 50) of the first tool has a wedge shape with an angle between the first and second edges of the blade of less than 90°, preferably between 20 and 60°.

22. Method as claimed in claim 20 or 21, characterized in that the first tool (18, 49) is suspended in units arranged to press the tool into contact with bones of the part carcass while the tool is moved (relatively) along the spinous processes and the dorsal side of the spinal column.

23. Method as claimed in claim 20, characterized in that the tapering blade (19, 50) of the first tool (18, 49) is moved with the tip and the knife part (2, 51) close to the bottom area of the spinous processes.

24. Method as claimed in claim 20, characterized in that the cutting blade (29, 56) of the second tool (28, 55) is moved so as to mainly intersect to the track of the knife part (20, 51) on the first tool (18, 49).

25. Method as claimed in claim 20, characterized in that cutting off of the ribs from the spinal column part is effected by means of the second cutting tool (28, 55).

26. Method as claimed in claim 20, characterized in that cutting off of the ribs from the spinal column part is effected by means of a third cutting tool.

27. Method as claimed in claim 20, characterized in that the spinal column part is supported during cutting.

28. Method as claimed in claim 20, characterized in that during cutting the position of the second tool (28, 55) in a direction at right-angles to the plane of the spinous processes is independent of the actual position of the first tool (18, 49) in the same direction.

29. Method for mechanical removal of a spinal column part from a part carcass (12), wherein the spinal column part is separated from the part carcass by cuts along the spinal column part which are performed by a relative movement between cutting tools and the part carcass, characterised in that a mechanical separation of the meat on the part carcass from the spinous processes and the dorsal side of the spinal column is effected by means of a cutting tool (18, 49) with a tapering knife blade (19, 50) and a knife part (20, 51) which is mounted mainly at right-angles to the blade along one edge thereof, whereby the knife blade (19, 50) is guided along the spinous processes and the knife part (20, 51) is moved along the dorsal side of the spinal column, and that the relative movement between the cutting tool (18, 49) and the part carcass is effected by means of a conveyor with a motor-driven endless carrier device (14, 43) with contact faces (15) for bone parts of the part carcass, said faces having sharp projections, and a guide surface (13, 47) for other bone parts of the part carcass, said guide surface extending mainly for the length of the conveyor.

30. Method as claimed in claim 29, characterized in that the cutting tool (18, 49) is suspended in units arranged to press the tool into contact with bones of the part carcass while the tool is moved (relatively) along the spinous processes and the spinal column.

31. Method as claimed in claim 29 or 30, characterized in that before cutting, the part carcass is placed with the rind side on a roller or belt conveyor (16, 17, 40) which is mounted opposite the contact faces (15) of the carrier device (14, 43), said conveyor (16, 17, 40) being resiliently suspended and arranged to press the part carcass against the sharp projections on the contact faces (15), and that the part carcass is then conveyed by the conveyor and guided into the gap between the conveyor (16, 17, 40) and the contact faces (15) of the carrier device (14, 43) and towards the guide surface (13, 47).

* * * * *

UNITED STATES PATENT AND TRADEMARK OFFICE
CERTIFICATE OF CORRECTION

PATENT NO. : 6,126,535
DATED : October 3, 2000
INVENTOR(S) : Post

It is certified that error appears in the above-indentified patent and that said Letters Patent is hereby corrected as shown below:

claim 15, line 1, "claim 15" should read -- claim 11 --.

Signed and Sealed this

First Day of May, 2001

Attest:

NICHOLAS P. GODICI

Attesting Officer     *Acting Director of the United States Patent and Trademark Office*